United States Patent [19]

Braden et al.

[11] Patent Number: 5,387,393
[45] Date of Patent: Feb. 7, 1995

[54] PREVENTION OF CRACKING AND BLISTERING OF REFINERY STEELS BY CYANIDE SCAVENGING IN PETROLEUM REFINING PROCESSES

[75] Inventors: Veronica K. Braden, Sugar Land, Tex.; Manian Ramesh, Naperville, Ill.

[73] Assignee: Nalco Chemical Company, Naperville, Ill.

[21] Appl. No.: 118,022

[22] Filed: Sep. 8, 1993

Related U.S. Application Data

[63] Continuation-in-part of Ser. No. 989,297, Dec. 11, 1992, abandoned.

[51] Int. Cl.⁶ .............................................. C23F 11/04
[52] U.S. Cl. ........................................ 422/12; 208/47; 252/390; 252/394; 252/401; 252/405; 422/16
[58] Field of Search .......................... 422/7, 14, 16, 12; 252/390, 394, 401, 405; 208/47

[56] References Cited

U.S. PATENT DOCUMENTS

| | | | |
|---|---|---|---|
| 4,009,243 | 2/1977 | Weber et al. | 423/234 |
| 4,595,723 | 6/1986 | Henson et al. | 524/398 |
| 4,978,366 | 12/1990 | Weers | 208/236 |
| 5,074,991 | 12/1991 | Weers et al. | 208/236 |

*Primary Examiner*—Robert J. Warden
*Assistant Examiner*—Robert Carpenter
*Attorney, Agent, or Firm*—Robert A. Miller; James J. Drake

[57] ABSTRACT

Corrosion, cracking and blistering of steels in contact with water containing refinery streams contaminated with cyanide is inhibited or prevented by treating the streams with a cyanide reactive scavenger comprising at least one amine-aldehyde reaction product.

20 Claims, 1 Drawing Sheet

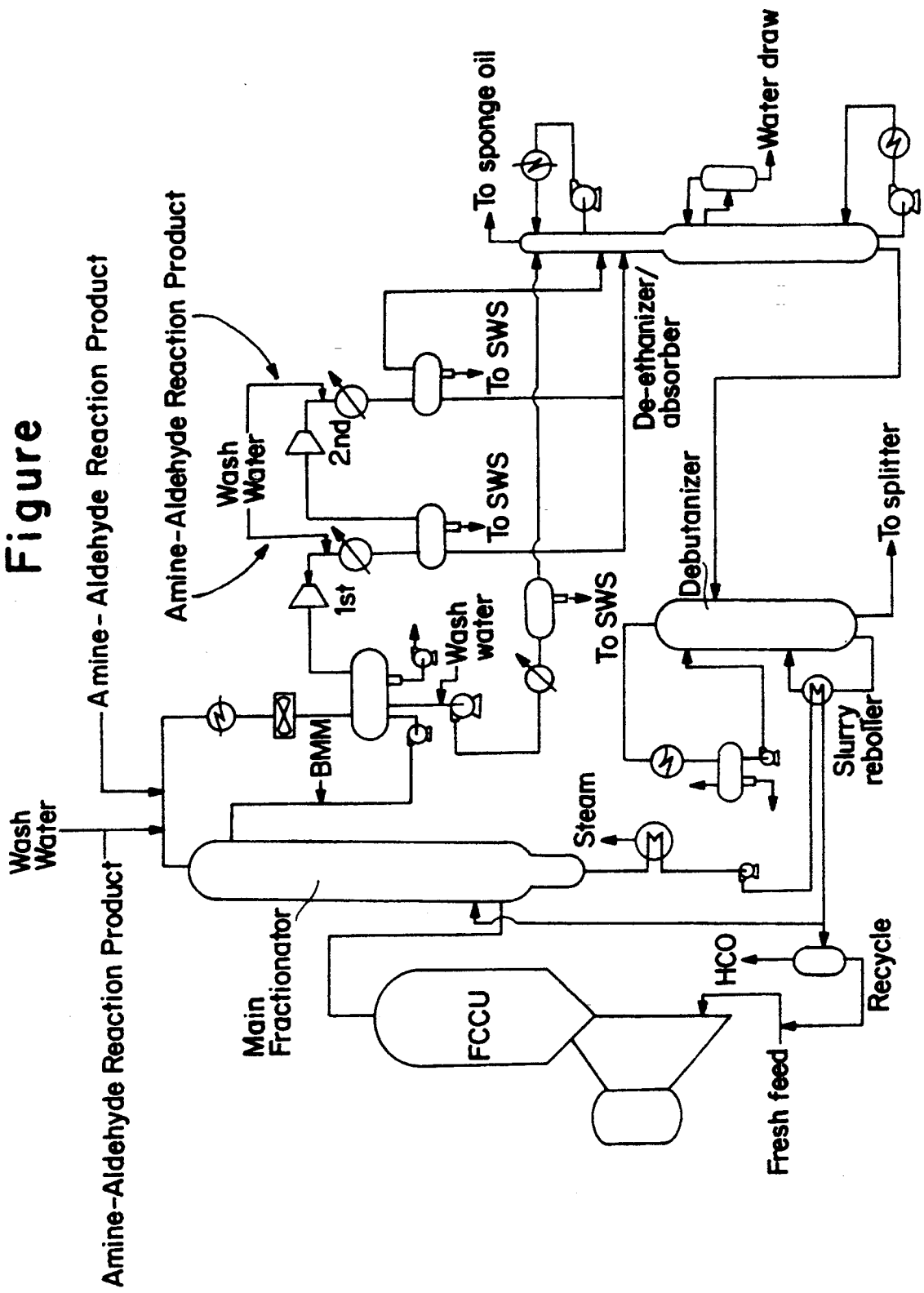

PREVENTION OF CRACKING AND BLISTERING OF REFINERY STEELS BY CYANIDE SCAVENGING IN PETROLEUM REFINING PROCESSES

This is a continuation in part of U.S. Ser. No. 07/989,297 filed on Dec. 11, 1992.

FIELD OF INVENTION

The present invention relates to a method for inhibiting cyanide induced corrosion of refinery equipment using a cyanide reactive scavenger. More particularly, the invention relates to inhibiting cyanide induced damage to steel and iron equipment in contact with water containing refinery streams such as overhead and wash water streams using at least one amine-aldehyde reaction product.

BACKGROUND OF INVENTION

Intergranular cracking and failure of carbon steel and/or piping and vessels occurs in certain refinery streams, especially refinery streams containing water. The metal vessels and piping in contact with these streams are subject to blistering and stress corrosion cracking due to certain chemical contaminants in the streams such as hydrogen sulfide, ammonia, carbon dioxide, hydrogen cyanide, and the like. The presence of these chemicals contributes to corrosion cracking and blistering of iron and steel vessels in contact with these refinery streams, particularly when these refinery streams contain water, hydrogen cyanide and hydrogen sulfide.

It would, therefore, be an advancement in the art if one could derive a composition which would react both with hydrogen sulfide and particularly with any source of cyanide, be it hydrogen cyanide or salts of cyanide. Even phenomena such as hydrogen blistering and hydrogen induced cracking appear to be dependent on the presence of cyanide. Therefore, the removal of cyanide from refinery streams in contact with these steel refinery vessels and piping should be beneficial in minimizing hydrogen blistering or hydrogen induced cracking.

SUMMARY OF THE INVENTION

The present invention provides a method for inhibiting cyanide induced corrosion of refinery equipment in contact with water containing refinery streams such as overhead and wash water streams.

The method comprises adding to water containing refinery streams contaminated with cyanide an effective amount of a cyanide reactive scavenger comprising at least one amine-aldehyde reaction product to inhibit corrosion, stress cracking, and blistering of steel and iron surfaces in contact with the streams. The amine-aldehyde reaction products are obtained by reacting one or more amines with one or more aldehydes in a molar ratio from about 2 to 1 to about 1 to 2 of NH group equivalents in the amines to aldehyde group equivalents in the aldehydes.

A BRIEF DESCRIPTION OF THE DRAWING

FIG. 1 describes a flow diagram of typical catalytic cracker including a fluid catalytic cracking unit (FCCU), a main fractionator, and accompanying equipment, such as a slurry re-boiler, a debutanizer, a de-ethanizer absorber, various condensers, storage vessels, pipelines, pumps, heaters, and the like.

The drawing is also used to illustrate the method of adding the cyanide reactive scavengers to effectively treat refinery overhead and wash water systems and inhibit corrosion, stress cracking, and blistering of steel and iron vessels and pipelines in contact with the streams, especially overhead streams associated with the main fractionators.

Although FIG. 1 primarily diagrams a catalytic cracker, a main fractionator and its associated equipment, other refinery operations, such as a pyrolytic cracking unit and the like may also contain overhead streams having cyanide, sulfide, water, and similar corrosive components and environments.

DETAILED DESCRIPTION OF THE INVENTION

Our invention is meant to treat water containing refinery streams contaminated with cyanide, and cyanide and sulfide to prevent and/or inhibit corrosion, stress cracking, and blistering of steel and iron surfaces in contact with these streams. In particular, the present invention relates to treating water containing refinery streams contaminated with cyanide as a free acid or salts thereof and hydrogen sulfide as the pre-acid or salts thereof.

Our cyanide reactive scavengers are particularly useful in the overhead and water wash streams associated with catalytic crackers. These refinery streams can contain hydrogen cyanide or cyanide salts, ammonia or ammonia salts, hydrogen sulfide or sulfide salts, as well as other acids, low molecular weight organics, water, and the like. These streams are particularly corrosive and cause blistering and cracking if left untreated.

We have found a method of inhibiting stress corrosion cracking and hydrogen blistering of carbon steels exposed to water or steam containing refinery gaseous and/or liquid streams contaminated with cyanide, which method comprises adding to the refinery streams an effective corrosion inhibiting amount of a cyanide reactive scavenger comprising at least one amine-aldehyde reaction product.

The amine-aldehyde reaction products useful in the present invention can be prepared by reacting amines with aldehydes under thermal or chemical dehydration reaction conditions where the water of reaction is removed from the reacting system to force the reaction to completion.

The water of reaction can be removed by any method well known in the art including straight or azeotropic distillation. Of course, direct separation methods may also be used when the amine-aldehyde reaction product is water insoluble. The water of reaction may also be removed through selective chemical reaction or through the use of semi-permeable membranes or other selective transport methods which will selectively remove water from a reacting system.

Typically, the amine-aldehyde reaction products of the present invention are obtained by reacting amines with aldehydes in molar ratios of from about 2 to 1 to about 1 to 2 of NH group equivalents in the amines to aldehyde group equivalents in the aldehydes. The preferred ratios are between about 1 to 1 to about 2 to 1 of NH group equivalents to aldehyde group equivalents.

Generally, the reaction between amines and aldehydes, particularly when the aldehyde is other than formaldehyde, is exothermic. If the exotherm of the reaction is not carefully controlled, then the reaction products of the present invention can also contain various enamines. The presence or absence of enamines does not affect the cyanide reactivity of the reaction products of the present invention and enamines are considered a component of the reaction products between amines and aldehydes and, therefore, a component of the cyanide reactive scavengers of the present invention.

The amines suitable for use in preparing the amine-aldehyde reaction products of the present invention include amines of formula (I)

$$R^1R^2NH \quad (I),$$

polyamines of formula (II)

$$HN(R^3)-Y-N(R^1)H \quad (II),$$

or mixtures thereof, where $R^1$ and $R^2$ are independently a H atom, a linear or branched C1 to C14 alkyl radical, a C5 to C6 cycloalkyl radical, a $(CH_2)_n$—$OR^6$ radical, where $R^6$ is a linear or branched C1 to C5 alkyl radical and n is an integer having a value from 2 to about 5, or where $R^1$ and $R^2$ are joined together to from a saturated heterocyclic ring with the nitrogen atom and where the ring atoms can contain one or more hetero atoms selected from the group consisting of O, N, or mixtures thereof with the remainder being carbon atoms. $R^3$ and $R^4$ are independently a H atom, a linear or branched C1 to C14 alkyl radical, a C5 to C6 cycloalkyl radical, a $(CH_2)_n$—$OR^6$ radical, or where $R^3$ and $R^4$ are joined together to form a saturated heterocyclic ring with the two nitrogen atoms and where the ring atoms can contain one or more atoms selected from the group consisting of O, N, or mixtures thereof with the remainder being carbon atoms, and where Y is a C1 to C6 alkenyl radical, or a $-(C_pH_{2p}A)_kC_pH_{2p}-$ radical where A is NH or O, p is an integer having a value from 1 to about 4, and k is an integer having a value from 1 to about 6. When $R^1$ and $R^2$ or $R^3$ and $R^4$ are joined together to form a saturated heterocyclic ring with their corresponding nitrogen atom or atoms, the resulting ring can include hetero atoms to form ring structures such as morpholine, piperazine, and the like.

The aldehydes suitable for use in preparing the reaction products of the present invention include aldehydes of formula (III)

$$R^5CHO \quad (III),$$

polyaldehydes of formula (IV)

$$OHC-Z-CHO \quad (IV),$$

or mixture thereof, where $R^5$ is H, a linear or branched C1 to C12 alkyl radical, an aryl radical, an alkyl aryl radical or an aryl alkyl radical and where Z is a C2 to C8 alkenyl radical, an aldehyde substituted C2 to C8 alkenyl radical, an aryl radical, an aldehyde substituted aryl radical, or the like.

The amines of formula (I) suitable for use in the present invention include, without limitation: (1) primary amines such as ammonia, methylamine, ethylamine, propylamine, isopropylamine, butylamine, isobutylamine, sec-butylamine, 2-ethylhexylamine, dodecylamine, and the like and cyclic amines including, without limitation, cyclohexylamine, 3-methylaminopyridine, and the like; or (2) secondary amines such as dimethylamine, diethylamine, methylethylamine, dipropylamine, disopropylamine, methylbutylamine, dibutylamine, di-(2-ethylhexyl)amine, didodecylamine, and the like, and cyclic and heterocyclic amines such as morpholine, 3-methylaminopyridine, piperidine, N-(2'-aminoethyl)-piperidine, and the like. Morpholine, dibutylamine, dimethylamine, and diisopropylamine are particularly preferred amines of formula (I).

Polyamines of formula (II) suitable for use in present invention include, without limitation, N,N-dimethylaminopropylamine, ethyl-4-amino-pentylamine, ethylenediamine, propylenediamine, diethylenetriamine, triethylenetetramine, tetraethylenepentamine, bishexamethylenetriamine, and the like. Ethylenediamine, propylenediamine, diethylene-triamine, triethylenetetramine, and tetraethylenepentamine are particularly preferred polyamines of formula (II).

Aldehydes of formula (III) suitable for use in the present invention include, without limitation, formaldehyde, acetaldehyde (ethanal), propanal, butanal, hexanal, heptanal, benzaldehyde, 4-methylbenzaldehyde, furfural and the like. These aldehydes can be used either as free aldehydes or as cyclic trimmers such as paraformaldehyde. Formaldehyde and paraformaldehyde are particularly preferred aldehydes.

Polyaldehydes of formula (IV) suitable in the preparation of the reaction products of the present invention include, without limitation, adipaldehyde, teraphthalic acid aldehyde, and the like.

Several chemical components make up the amine-aldehyde reaction products of the present invention. Diaminomethanes, depicted by formula (V), represent one such component:

$$R^7R^8N-CH(R^9)-NR^{10}R^{11} \quad (V)$$

where $R^7$, $R^5$, $R^{10}$, and $R^{11}$ are derived from the substituents described for the amines of formula (I) and the polyamines of formula (III) and where $R^9$ is derived from the substituents described for the aldehydes of formula (III) and the polyaldehydes of formula (IV).

Besides the diaminomethanes, amine capped polyoxymethylene ethers of formula (VI) represent another such component:

$$R^{12}R^{13}N-[CH(R^{14})O]_qCH(R^{15})-NR^{16}R^{17} \quad (VI)$$

where $R^{12}$, $R^{13}$, $R^{16}$, and $R^{17}$ are derived from the substituents described for the amines of formula (I) and the polyamines of formula (II) and where $R^{14}$ which at each occurrence may be the same or different, and $R^{15}$ are derived from the substituents described for the aldehydes of formula (III) and the polyaldehydes of formula (IV) and where q is preferably an integer having a value from 1 and about 6. Of course, higher values of q are also possible.

In addition, the reaction products obtained from ammonia and formaldehyde can contain predominantly polycyclic amine such as hexamethylenetetramine and the like.

The exact mixture of diaminomethanes, amine capped polyoxymethylene ethers, and/or polycyclic amines in a given amine-aldehyde reaction product can vary widely depending on the exact ratio and type of amines and aldehydes used. The mixture of components can also vary depending on the reaction conditions and manner of addition of the amines and aldehydes.

Additionally, at higher reaction temperatures, enamines of formula (VII) can also form and represent another such component $R^{18}R^{19}N—CH(=R^{20})$ (VII)

where $R^{18}$ and $R^{19}$ are derived from the substituents described for the amines of formula (I) and the polyamines of formula (II) and where $R^{20}$ is derived from the substituents described for the aldehydes of formula (III) and the polyaldehydes of formula (IV). An artisan of ordinary skill should recognize that the substituents from which the $R^{20}$ radical is derived must have a CH group α to the carbonyl group of the aldehyde used to prepare the reaction product. Enamines of formula (VII) are also effective in scavenging cyanide. Cyanide salts are thought to first react with enamines in a Michael type reaction and subsequently in a substitution reaction. Of course, one of ordinary skill will recognize tht enamines tautonezie to imines and that the imines are also considered reaction products of amine and aldehydes of the present invention.

Generally speaking, the amine-aldehyde reaction products of the present invention will contain more diaminomethane when the ratio of NH group equivalents to aldehyde group equivalents is about 2 to 1, while the reaction products will contain increasing amounts of amine capped polyoxymethylene ethers when the ratio of NH group equivalents to aldehyde group equivalents is less than 2 to 1.

In fact, the reaction products can contain diaminomethanes substantially free of amine capped polyoxymethylene ethers and enamines by slowly adding the aldehydes to a solution containing the amines such that there are 2 NH group equivalents for each aldehyde equivalent and carefully controlling the reaction temperature. The slow addition of aldehydes to the 2 to 1 ratioed solution of amines based on NH group equivalents to aldehyde equivalents almost completely eliminates amine capped polyoxymethylene ether formation.

Polycyclic amines are preferentially formed by reacting ammonia with formaldehyde in ratios from about 2 to 1 to about 1 to 1 of NH group equivalents per aldehyde equivalent. For hexamethylenetetramine, the preferred ratio is 2 to 1.

Although the reaction products or mixtures of the present invention are obtained by reacting amines with aldehydes in molar ratios of from about 2 to 1 to about 1 to 2, the preferred ratios for amines of formulas (I), (II), or mixtures thereof reacting with aldehydes of formulas (III), (IV), or mixtures thereof are from about 1 to 1 to about 2 to 1 based on NH group equivalents in the amines and aldehyde equivalents in the aldehydes. A particularly preferred ratio is about a 2 to 1 ratio of NH group equivalents to aldehyde equivalents.

The components represented by Formulas (V), (VI), and/or (VII), and mixtures thereof are understood to be known components of the amine-aldehyde reaction products of the present invention. One of ordinary skill should recognize that the reaction products of the present invention may also contain other components as well.

CYANIDE SCAVENGING REACTIONS

Laboratory reactions have demonstrated that the cyanide reactive scavengers of the present invention react nearly quantitatively with cyanide ions. The reaction is thought to occur as depicted in Reaction A below where a diaminomethane of formula (V) reacts with $CN^-$ to form an amine and an acetamide:

$$R_2N—CH_2—NR_2 + CN^- \xrightarrow{H_2O}$$ (Reaction A)

$$R_2NH + R_2N—CH_2—C(O)NH_2$$

where R is a generic substituent within the range of substituents described previously.

As earlier stated, Reaction A is essentially quantitative. Also, note that both the diaminomethane and the acetamide product obtained by reacting the diaminomethane with cyanide (after hydrolysis) are both amines capable of neutralizing acids, such as $H_2S$.

Of course, an analogous reaction occurs between amine capped polyoxymethylenes ethers of formula (VI) and $CN^-$. As stated previously, enamines of formula (VII) are thought first to react with $CN^-$ in a Michael type addition to yield an acetamide α to the amine substituted carbon. Subsequently, it is thought that this intermediate can further react with $CN^-$ in a manner analogous to Reaction A.

The method of our invention is useful in treating primarily water containing refinery streams, such as overhead and wash water streams. These streams are especially corrosive because the cyanide preferentially partitions itself in the aqueous component of the stream. Aqueous cyanide is the agent thought to be chiefly responsible for the damage to iron or steel equipment.

The method of the present invention is applicable to any wash water stream such as the wash water streams associated with a main fractionator, a debutanizer, a de-ethanizer or absorber or any cracking tower, and such condensers, absorbers, storage vessels, and pipelines related to the operation of a main fractionator or a catalytic cracking tower operating in the refinery.

In treating the refinery overhead and/or wash water streams i.e., water containing refinery streams, the cyanide reactive scavengers may be added neat, as a solution, as an emulsion, or as a dispersion to the refinery streams. The scavengers may be added to the refinery stream as either an aqueous or an organic solution. The aqueous scavenger solutions can be added as an emulsion or dispersion in an organic solvent, while the organic scavenger solutions can be added as an emulsion or a dispersion in water. Typical, organic solvents include, without limitation, pyrolysis gasoline, aromatics, naphthas, petroleum ethers, or the like.

Aqueous solutions, emulsions in an organic solvent, or dispersions in an organic solvent are preferred treating agents for water soluble scavenges such as morpholine-formaldehyde reaction products, but these agents may also contain alcohols such as ethanol and the like. Organic solutions, emulsions in water, or dispersions in water are preferred treating agents for water insoluble scavengers such as dibutylamine-formaldehyde reaction products or dimethylamine-formaldehyde reaction products.

A preferred water soluble scavenger comprises reaction products of morpholine and formaldehyde. Bis-morpholinomethane, a diaminomethane of formula (V), is primarily water soluble, but it can also be distributed and/or dissolved in organic solvents such as aromatic hydrocarbons. A preferred water insoluble scavenger comprises dibutylamine-formaldehyde reaction products.

Generally, the treating formulations (aqueous, alcoholic, aromatic, emulsions, dispersions or mixtures thereof,) contain at least 1.0 weight percent of the cyanide reactive scavengers based on the weight of solvent, but may contain from about 20 to as high as 90 weight percent of the cyanide reactive scavengers.

When the scavengers are added as a solution, emulsion or dispersion, it is done so primarily for the ease of adding and/or for accurate metering of the scavengers into the refinery overhead and/or wash water stream being treated. The effectiveness of the cyanide reactive scavengers of the present invention are essentially unaffected by the formulation method employed.

When these scavengers are being added to water containing refinery streams, preferably the aqueous portion of the streams should be at a pH greater than 5.0, more particularly at a pH of greater than 6, and especially at pH greater than 7. However, the streams can also be at a pH less than 5. However, at pH's less than 5, the reaction mechanism may not be the same as that depicted in Reaction A above.

The cyanide reactive scavengers are added to the refinery stream, again preferably water containing refinery streams, contaminated with cyanide either as the free acid or salt thereof. When these scavengers are added to cyanide containing streams, they are added in an amount effective to inhibit corrosion, cracking, and blistering of steel and iron vessels in contact with the streams. Preferably, the amount is effective to provide for substantially quantitative or analytical removal of cyanide from the stream.

The preferred amount would provide at least a 1 to 1 molar ratio of cyanide reactive groups in the scavenger to cyanide present in the stream. The cyanide reactive groups of the scavengers are either the diaminomethane groups or the amine substituted carbon atoms in the amine capped polyoxymethylene ethers present in the particular amine-aldehyde reaction products. A particularly preferred amount would be to provide at least a molar excess of scavengers to cyanide in the stream. However, submolar amounts of the scavengers may be added to remove at least a portion of the cyanide present. We believe that any removal of cyanide will cause a decrease in corrosion, cracking, and blistering of steel and iron vessels in contact with cyanide contaminated refinery streams.

Overhead and preferably wash water streams may be treated with amounts of scavenger ranging from about 0.5 to about 2500 ppm based on the weight of the stream to be treated. One of ordinary skill should recognize that the scavenger is actually continuously added to the stream and the amount of scavenger added is sufficient to achieve a desired ppm level based on the stream throughput. Preferably, the streams are treated with amounts of scavenger ranging from about 1.0 to about 2000 ppm.

It is a benefit that the cyanide reactive scavengers of the present invention can also react with hydrogen sulfide. When refinery streams contain both hydrogen sulfide, either as the pre-acid or salts thereof, and cyanide or salts there of, these streams may successfully be treated to inhibit corrosion, cracking, and blistering of steel and iron surfaces in contact with the streams by treating them with the scavengers of the present invention.

Preferably, when a water containing refinery stream contains both hydrogen sulfide and hydrogen cyanide, or their salts, the effective amount of added scavenger should be sufficient to react with substantially all of the hydrogen sulfide and hydrogen cyanide or their salts present in the stream. Thus, one preferred treatment would add sufficient scavenger to provide at least a 1 to 1 molar ratio of cyanide reactive groups in the scavenger to cyanide and sulfide present in the stream. We believe that sulfide anions will react with the scavengers in a reaction analogous to Reaction A described above.

A preferred method for treating overhead and wash water streams associated with the FCCU is to add the scavengers of the present invention to several of these streams. The preferred streams are a cracker overhead stream, a main fractionator overhead stream and a plurality of wash water streams associated with the cracker unit and the main fractionator. The amounts of scavenger added in each stream should be sufficient to inhibit corrosion in steel or iron equipment in contact with those streams. Of course, one skilled in the art should recognize that the scavengers can be added to any or all overhead and wash water streams.

The following examples illustrate that we have discovered a method for removing cyanide in an essentially quantitative manner from refinery streams. By eliminating cyanide, we eliminate one of the catalytic causes of cracking, corrosion, and blistering of steel surfaces exposed to cyanide. The following reactions are run under conditions meant to mimic actual refinery streams, particularly overhead and wash water streams.

EXAMPLE 1

This example illustrates the synthesis of a morpholine-formaldehyde reaction product based on a one to one molar ratio of NH group equivalents of morpholine and aldehyde group equivalents of formaldehyde, i.e., a one to one molar ratio of morpholine to formaldehyde.

One mole of morpholine (87 grams) was added to a 3-neck round bottom flask equipped with a thermometer, a condenser, a stirrer, and a heating unit. The morpholine was cooled to about 3° C. One mole of paraformaldehyde (33 grams) was added slowly with stirring to the cooled morpholine. After addition of the paraformaldehyde, the reaction contents were allowed to warm to room temperature (approximately 20° C.-25° C.) over about a 90 minute period. The reaction contents were then heated to 110° C. for two hours and cooled. The morpholine-formaldehyde reaction product remained miscible with the water formed during the reaction. Analysis indicated the presence of bis-morpholinomethane.

The reaction product was dissolved in a heavy aromatic naphtha obtained commercially. This solution became cloudy upon addition of the heavy aromatic naphtha and water settled to the bottom of the flask. Approximately 30 mL of water was removed using a separator funnel and the remaining hydrocarbon solution was dried over calcium sulfate, filtered, and stored. The heavy aromatic naphtha was removed in vacuo to obtain the product which analyzed as containing bis-morpholinomethane.

EXAMPLE 2

In this example an aqueous solution of potassium cyanide (KCN) was treated with approximately one mole equivalent of bis-morpholinomethane (BMM) of Example 1.

650 milligrams of a 93 weight percent aqueous solution of BMM of example 1 (approximately 1 equivalent) was added to an aqueous KCN solution containing 1.3 grams of KCN (approximately 1 equivalent). This mixture was heated to 90° C. for four hours. The solution was cooled to room temperature and acidified with dilute hydrochloric acid to pH 7. This essentially neutral solution was then extracted with methylene chloride and the methylene chloride extract was collected, dried over sodium sulfate, and evaporated on a rotovap to yield a product. The product was identified as the BMM acetamide product of Reaction A. The yield was essentially quantitative. The BMM acetamide is essentially soluble in water, but will preferentially partition into methylene chloride.

The conclusion was that BMM reacts essentially quantitatively with cyanide and is an excellent cyanide ion scavenger of example 1.

EXAMPLE 3

In this example an aqueous solution of potassium cyanide (KCN) containing hydrogen sulfide $H_2S$ was treated with a bis-morpholinomethane (BMM) containing scavenger of Example 1.

A blend of a product containing the reaction adduct materials from formaldehyde and morpholine in water of example 1, which product contained from 70–90 weight percent BMM, was reacted with KCN in a water solution containing $H_2S$. The 70–90 weight percent bis-morpholinomethane (1.5 grams) and potassium cyanide (650 milligrams in water) were added to 50 milliliters of water and heated to 90° C. for a period of 3 hours. The mixture was cooled to room temperate and the pH was again brought to 7 by the addition of hydrochloric acid. This solution was again extracted with methylene chloride and the organic extract was washed with water, dried, and evaporated to give a methylene chloride residue, which was analyzed by nuclear magnetic resonance spectroscopy. The product was a mixture of the BMM acetamide product of Reaction A and bis-morpholino dimethyl ether. The bis-morpholino dimethyl ether is an anticipated by-product of the reaction between formaldehyde and morpholine, and is a compound represented by Formula (V) above where the amine is morpholine $R^{14}$ and $R^{15}$ are H and q is 1.

EXAMPLE 4

In this example, a morpholine-formaldehyde reaction product was prepared using a 2 to 1 molar ratio of morpholine to formaldehyde.

7.9 grams of morpholine (0.1 moles) and 100 mL of toluene were added to a 4 necked flask equipped with a thermocouple, Dean-Stark condenser, a nitrogen purge, and a stirrer. 1.5 grams of paraformaldehyde (about 0.05 moles) was slowly added to the flask keeping the temperature below 20° C. The reaction mixture was then slowly heated to reflux and kept at reflux for about 3 hours and then cooled. The reaction mixture was evaporated to dryness using a rotary evaporator. The remaining material was analyzed to be a nearly quantitative yield of bis-morpholinomethane.

EXAMPLE 5

In this example, the morpholine-formaldehyde reaction product of example 4 (essentially pure bis-morpholinomethane) was used to treat a potassium cyanide (KCN) and hydrogen sulfide contaminated aqueous solution.

1200 ppm of the reaction product of example 4 (2.6 mL an aqueous methanol solution) was added to an aqueous solution containing 500 ppm KCN and 500 ppm $H_2S$. The aqueous methanol solution consisted of 10 mL of methanol in 40 mL of water. The reaction mixture was heated from 20° C. to 80° C. over approximately 30 minutes and maintained at 80° C. for about two hours. The mixture was then cooled to room temperature and analyzed. The analysis indicated that 91+ percent of the KCN had been removed.

Thus, the reaction product of example 4 (essentially pure bismorpholinomethane) is a good cyanide ion scavenger, while the morpholine nitrogen is capable of simultaneously neutralizing hydrogen sulfide.

EXAMPLE 6

This example illustrates the synthesis of a dibutylamine-formaldehyde reaction product based on a one to one molar ratio of NH group equivalents of di-n-butylamine and aldehyde group equivalents of formaldehyde, i.e., a one to one molar ratio of di-n-butyl to formaldehyde.

One mole of di-n-butylamine (129 grams) was added to a 3-neck round bottom flask equipped with a thermometer, a condenser, a stirrer. and a heating unit. The di-n-butylamine was cooled to about 3° C. One mole of paraformaldehyde (33 grams) was added slowly with stirring to the cooled di-n-butylamine. After addition of the paraformaldehyde, the reaction contents were allowed to warm to room temperature (approximately 20° C.–25° C.) over about a 90 minute period. The reaction contents were then heated to 110° C. for two hours and cooled. The reaction product was insoluble in water and the reaction media separated into two phases. The water of the reaction was drained off and the reaction product was analyzed and indicated the presence of bis-dibutylaminomethane.

EXAMPLE 7

In this example an aqueous solution of potassium cyanide (KCN) was treated with approximately one mole equivalent of the bis-dibutylaminomethane (DBA) reaction product of Example 6.

650 milligrams of a 93 weight percent an alcoholic solution of the DBA reaction product of example 6 (approximately 1 equivalent) was added to an aqueous KCN solution containing 1.3 grams of KCN (approximately 1 equivalent). This mixture was heated to 90° C. for four hours. The solution was cooled to room temperature and acidified with dilute hydrochloric acid to pH 7. This essentially neutral solution was then extracted with methylene chloride and the methylene chloride extract was collected, dried over sodium sulfate, and evaporated on a rotovap to yield a product. The product was identified as the DBA acetamide product of Reaction A. The yield was essentially quantitative. The DBA acetamide is essentially soluble in water, but will preferentially partition into methylene chloride.

The conclusion was that the DBA reaction product of example 6 reacted essentially quantitatively with cyanide and is an excellent cyanide ion scavenger.

EXAMPLE 8

This example illustrates the synthesis of a dimethylamine-formaldehyde reaction product based on a one to one molar ratio of NH group equivalents of dimethylamine and aldehyde group equivalents of formaldehyde, i.e., a one to one molar ratio of dimethylamine to formaldehyde.

One mole of dimethylamine (112.5 grams of a 40% by weight aqueous solution) was added to a 3-neck round bottom flask equipped with a thermometer, a condenser, a stirrer, and a heating unit. The dimethylamine was cooled to about 5°–10° C. One mole of paraformaldehyde (33 grams) was added slowly with stirring to the cooled dimethylamine. After addition of the paraformaldehyde, the reaction contents were allowed to warm to room temperature (approximately 20° C.–25° C.) over about a 90 minute period. The reaction contents were then heated to 110° C. for two hours and cooled. The dimethyl-formaldehyde reaction product separated from the water formed during the reaction and the water was decanted or drained form the reaction product. Analysis indicated the presence of bis-dimethylaminomethane.

EXAMPLE 9

In this example an aqueous solution of potassium cyanide (KCN) was treated with approximately one mole equivalent of bis-dimethylaminomethane (DMA) reaction product of Example 8.

650 milligrams of a 93 weight percent an alcoholic solution of the DMA reaction product of example 8 (approximately 1 equivalent) was added to an aqueous KCN solution containing 1.3 grams of KCN (approximately 1 equivalent). This mixture was heated to 90° C. for four hours. The solution was cooled to room temperature and acidified with dilute hydrochloric acid to pH 7. This essentially neutral solution was then extracted with methylene chloride and the methylene chloride extract was collected, dried over sodium sulfate, and evaporated on a rotovap to yield a product. The product was identified as the DMA acetamide product of Reaction A. The yield was essentially quantitative. The DMA acetamide is essentially soluble in water, but will preferentially partition into methylene chloride.

The conclusion was that the DMA reaction product of example 8 reacted essentially quantitatively with cyanide and is an excellent cyanide ion scavenger.

EXAMPLE 10

In this example, a dibutylamine-formaldehyde reaction product was prepared using a 2 to 1 molar ratio of di-n-butylamine to formaldehyde.

12.9 grams of di-n-butylamine (0.1 moles) and 100 mL of toluene were added to a 4 necked flask equipped with a thermocouple, Dean-Stark condenser, a nitrogen purge, and a stirrer. 1.5 grams of paraformaldehyde (about 0.05 moles) was slowly added to the flask keeping the temperature below 20° C. The reaction mixture was then slowly heated to reflux and kept at reflux for about 3 hours and then cooled. The reaction mixture was evaporated to dryness using a rotary evaporator. Analysis indicated that the remaining material represented a nearly quantitative yield of bis-di-n-bytylaminomethane.

EXAMPLE 11

In this example, the dibutylamine-formaldehyde reaction product of example 10 (essentially pure bis-dibutylaminomethane) was used to treat a potassium cyanide (KCN) and hydrogen sulfide contaminated aqueous solution.

1200 ppm of the reaction product of example 10 was dissolved in 2.6 mL of methanol. The methanolic solution was added to an aqueous solution containing 500 ppm KCN and 500 ppm $H_2S$. The reaction mixture was heated from 20° C. to 80° C. over approximately 30 minutes and maintained at 80° C. for about two hours. The mixture was then cooled to room temperature and analyzed. The analysis indicated that 91+ percent of the KCN had been removed.

Thus, the reaction product of example 10 is a good cyanide ion scavenger, while the dibutylamine nitrogen is capable of simultaneously neutralizing hydrogen sulfide.

EXAMPLE 12

In this example, a dimethylamine-formaldehyde reaction product was prepared using a 2 to 1 molar ratio of dimethylamine to formaldehyde.

11.25 grams of a 40% by weight aqueous solution of dimethylamine (0.1 moles) and 100 mL of toluene were added to a 4 necked flask equipped with a thermocouple, Dean-Stark condenser, a nitrogen purge, and a stirrer. 1.5 grams of paraformaldehyde (about 0.05 moles) was slowly added to the flask keeping the temperature below 20° C. The reaction mixture was then slowly heated to reflux and kept at reflux for about 3 hours and then cooled. The reaction mixture was evaporated to dryness using a rotary evaporator. The remaining material was analyzed to be a nearly quantitative yield of bis-dimethylaminomethane.

EXAMPLE 13

In this example, the dimethylamine-formaldehyde reaction product of example 12 (essentially pure bis-dimethylaminomethane) was used to treat a potassium cyanide (KCN) and hydrogen sulfide contaminated aqueous solution.

1200 ppm of the reaction product of example 12 was dissolved in 2.6 mL of methanol. The methanolic solution was added to an aqueous solution containing 500 ppm KCN and 500 ppm $H_2S$. The reaction mixture was heated from 20° C. to 80° C. over approximately 30 minutes and maintained at 80° C. for about two hours. The mixture was then cooled to room temperature and analyzed. The analysis indicated that 91+ percent of the KCN had been removed.

Thus, the reaction product of example 12 is a good cyanide ion scavenger, while the dimethylamine nitrogen is capable of simultaneously neutralizing hydrogen sulfide.

EXAMPLE 14

This example illustrates the concentration of various contaminants in the water portion of a typical refinery overhead stream associated with a fluid catalytic cracking unit.

| <<<WATER ANALYSIS>>> | *DISSOLVED* PPM | TOTAL PPM |
|---|---|---|
| CATIONS: | | |
| Sodium (CaCO3) | 130 | 130 |
| Calcium (CaCO3) | 5 | 5 |
| Magnesium (CaCO3) | 3 | 3 |
| Iron (Fe) | | 3 |
| ANIONS: | | |
| Phosphorus (PO4) | 22 | 22 |
| Sulfur (SO4) | 8000 | 11000 |
| Silica (SiO2) | 3 | 3 |
| Boron (B) | <2 | <2 |
| Chloride (CaCO3) | <20 | |
| Sulfate (CaCO3) | 250 | |
| Nitrate (CaCO3) | <2 | |
| Nitrite (NO2) | <20 | |
| Cyanide (CN)-Total | | 16. |
| Cyanide (CN)-Weak Acid Dissociable | | 8.0 |

-continued

| <<<WATER ANALYSIS>>> | | |
|---|---|---|
| | *DIS-SOLVED* PPM | TOTAL PPM |
| OTHERS: | | |
| Organic Carbon (C)-Total | | 1200. |

*Passes through 0.45 Micron filter*
The ICP detection limit is 2 ppm.

Thus, the water portion of a typical refinery overhead stream associated with a fluid cat cracker contains appreciable concentrations of contaminants including sulfides and cyanides.

EXAMPLE 15

This example illustrates the concentration of various contaminates in the water portion of a typical refinery wash water stream associated with a fluid catalytic cracking unit.

| <<<WATER ANALYSIS>>> | | |
|---|---|---|
| | *DIS-SOLVED* PPM | TOTAL PPM |
| CATIONS: | | |
| Sodium (CaCO3) | 5300 | 5300 |
| Calcium (CaCO3) | 5 | 7 |
| Magnesium (CaCO3) | 3 | 3 |
| ANIONS: | | |
| Phosphorus (PO4) | 3.3 | 18. |
| Sulfur (SO4) | 1200. | 5100. |
| Silica (SiO2) | 7.4 | 12. |
| Boron (B) | <2.2 | <2.5 |
| Chloride (CaCO3) | <74 | |
| Sulfate (CaCO3) | 37 | |
| Nitrate (CaCO3) | <2 | |
| Nitrite (NO2) | <2 | |
| Cyanide (CN)-Total | | 0.27 |
| Cyanide (CN)-Weak Acid Dissociable | | 0.21 |
| OTHERS: | | |
| Organic Carbon (C)-Total | | 460. |

*Passes through 0.45 Micron filter*
The ICP detection limit is 2 ppm.

Thus, the water portion of a typical refinery wash water stream associated with a fluid cat cracker contains appreciable concentrations of cyanides and sulfides and are especially corrosive.

While in accordance with the patent statutes, the best mode and preferred embodiments of the invention have been described, it is to be understood that the invention is not limited thereto, but rather is to be measured by the scope and spirit of the appended claims.

Having described our invention, we claim:

1. A method of preventing cyanide induced corrosion, cracking, and blistering of steel and iron vessels and pipelines comprising the step of adding to water containing refinery streams contaminated with cyanide, either as free acid or salts thereof, an effective corrosion, cracking, and blistering inhibiting amount of a cyanide reactive scavenger comprising at least one amine-aldehyde reaction product.

2. The method of claim 1, wherein the water containing refinery streams are selected from the group consisting of overhead streams and wash water streams.

3. The method of claim 1, wherein the water containing stream is associated with at least one of the refinery operations selected from the group consisting of a main fractionator, a cracking tower, and any heat exchangers, condensers, debutanizers, de-ethanizers, absorbers, or storage vessels related to the operation of a main fractionator or a cracking tower.

4. The method of claim 1, wherein the amount of scavenger added is at least 0.5 ppm, based on the stream weight.

5. The method of claim 1, wherein the amount of scavenger added is from 0.5 ppm to about 2500 ppm, based on the stream weight.

6. The method of claim 1, wherein the refinery stream also contains at least one component selected from the group consisting of hydrogen sulfide, ammonia, and hydrochloric acid.

7. The method of claim 1, wherein the scavengers are dissolved in at least one solvent selected from the group consisting of water, methanol, ethanol, propanol, isopropanol, and aromatic hydrocarbons, and the stream is a wash water stream for a main fractionator.

8. The method of claim 1, wherein the amine-aldehyde reaction products are obtained by reacting one or more amines with one or more aldehydes in a molar ratio from about 2 to 1 to about 1 to 2 of NH group equivalents in the amines to aldehyde group equivalents in the aldehydes.

9. The method of claim 8, wherein the amines are selected from the group consisting of amines of formula (I)

$$R^1R^2NH \qquad (I),$$

polyamines of formula (II)

$$HN(R^3)-Y-N(R^4)H \qquad (II),$$

and mixtures thereof, where $R^1$ and $R^2$ are independently a H atom, a linear or branched C1 to C14 alkyl radical, a C5 to C6 cycloalkyl radical, a $(CH_2)_n-OR^6$ radical, where $R^6$ is a linear or branched C1 to C5 alkyl radical and n is an integer having a value from 2 to about 5, or where $R^1$ and $R^2$ are joined together to from a saturated heterocyclic ring with the nitrogen atom and where the ring atoms can contain one or more hetero atoms selected from the group consisting of O, N, or mixtures thereof with the remainder being carbon atoms; where $R^3$ and $R^4$ are independently a H atom, a linear or branched C1 to C14 alkyl radical, a C5 to C6 cycloalkyl radical, a $(CH_2)_n-OR^6$ radical, or where $R^3$ and $R^4$ are joined together to form a saturated heterocyclic ring with the two nitrogen atoms and where the ring atoms can contain one or more atoms selected from the group consisting of O, N, or mixtures thereof with the remainder being carbon atoms, and where Y is a C1 to C6 alkenyl radical, or a $-(C_pH_{2p}A)_kC_pH_{2p}-$ radical where A is NH or O, p is an integer having a value from about 2 to about 4, and k is an integer having a value from 1 to about 6.

10. The method of claim 8, wherein the aldehyde are selected from the group consisting of aldehydes of formula (III)

$$R^5CHO \qquad (III),$$

polyaldehydes of formula (IV)

$$OHC-Z-CHO \qquad (IV),$$

or mixture thereof, where $R^5$ is H, a linear or branched C1 to C12 alkyl radical, an aryl radical, an alkyl aryl radical or an aryl alkyl radical and Z is a C2 to C8 alkenyl radical, an aldehyde substituted C2 to C8 alkenyl radical, an aryl radical, an aldehyde substituted aryl radical, or the like.

11. The method of claim 9, wherein the polyamines of formula (II) are selected from the group consisting of ethylenediamine, propylenediamine, diethylenetriamine, triethylenetetramine, and tetraethylenepentamine.

12. The method of claim 9, wherein the amines of formula (I) are selected from the group consisting of morpholine, dibutylamine, dimethylamine, and diisopropylamine.

13. The method of claim 10, wherein the aldehydes of formula (III) are selected from the group consisting of formaldehyde and paraformaldehyde.

14. The method of claim 8, wherein the amine-aldehyde reaction product is a morpholine-formaldehyde reaction product.

15. The method of claim 14, wherein the morpholine-formaldehyde reaction product is bis-morpholinomethane.

16. The method of claim 1, wherein the amount of scavenger added is sufficient to maintain a molar excess of scavenger to cyanide in the stream weight.

17. The method of claim 8, wherein the amine-aldehyde reaction product is an di-n-butylamine-formaldehyde reaction product.

18. The method of claim 17, wherein the di-n-butylamine-formaldehyde reaction product is bis-di-n-butylaminomethane.

19. The method of claim 8, wherein the amine-aldehyde reaction product is a di-methylamine-formaldehyde reaction product.

20. The method of claim 19, wherein the di-methylamine-formaldehyde reaction product is bis-dimethylaminomethane.

* * * * *